United States Patent
Welch et al.

(10) Patent No.: US 6,243,685 B1
(45) Date of Patent: Jun. 5, 2001

(54) VOICE OPERATED INTERACTIVE MESSAGE DISPLAY SYSTEM FOR VEHICLES

(75) Inventors: Henry L. Welch, Grafton, WI (US); Rick C. Bergman, P.O. Box 17169, Glendale, WI (US) 53217-0169

(73) Assignee: Rick C. Bergman, Glendale, WI (US)

(*) Notice: Subject to any disclaimer, the term of this patent is extended or adjusted under 35 U.S.C. 154(b) by 0 days.

(21) Appl. No.: 09/246,315

(22) Filed: Feb. 8, 1999

(51) Int. Cl.⁷ .................................................. G10L 21/00
(52) U.S. Cl. ...................... 704/276; 704/274; 704/275; 704/270; 434/307; 340/426; 340/479; 349/68
(58) Field of Search .................................... 704/270–275, 704/276; 706/20; 349/68, 62; 368/63; 340/426, 479; 701/202; 434/307

(56) References Cited

U.S. PATENT DOCUMENTS

| | | | |
|---|---|---|---|
| 3,838,909 | * 10/1974 | Fitzgibbons | 349/62 |
| 4,367,923 | * 1/1983 | Ishikawa | 349/68 |
| 4,928,084 | * 5/1990 | Reiser | 340/479 |
| 5,020,107 | * 5/1991 | Rohani et al. | 704/275 |
| 5,132,666 | 7/1992 | Fahs . | |
| 5,163,111 | * 11/1992 | Baji et al. | 706/20 |
| 5,231,670 | * 7/1993 | Goldhor et al. | 704/275 |
| 5,426,414 | 6/1995 | Flatin et al. . | |
| 5,444,673 | * 8/1995 | Mathurin | 368/63 |
| 5,463,827 | 11/1995 | Williams . | |
| 5,500,638 | 3/1996 | George . | |
| 5,557,254 | * 9/1996 | Johnson et al. | 340/426 |
| 5,574,428 | 11/1996 | Groover . | |
| 5,578,986 | 11/1996 | Isobe et al. . | |
| 5,587,911 | * 12/1996 | Asano et al. | 701/202 |
| 5,664,948 | * 9/1997 | Dimitriades et al. | 434/307 |

FOREIGN PATENT DOCUMENTS

WO 98/52789    11/1998  (WO) .............................. B60Q/1/50

OTHER PUBLICATIONS

Smith J.T., ("An approach to customer centred interface", Record., 1994 Third Annual International Conference on Universal Persinal Communications, 9/94, pp. 619–623), Sep. 1994.*

* cited by examiner

Primary Examiner—David Hudspeth
Assistant Examiner—Vijay B Chawan
(74) Attorney, Agent, or Firm—Michael Best & Friedrich LLP

(57) ABSTRACT

A voice-operated, interactive message display system designed for inter-vehicle and extra-vehicle communications. The system includes one or more display units having a matrix of light-emitting elements to transmit a message to other vehicles either to the front, rear, side, or combination thereof. The display units are controlled by a central control unit having a voice recognition and voice synthesis system, which is used to interactively determine a message to display and on which displays to present it. Upon manual activation, the message system vocally prompts the user for the message to display and the parameters for its display. The system may be implemented in at least two different embodiments. In one embodiment a powerful vocabulary memory unit is used and the content of the message is run-time programmable. If a less expensive vocabulary unit is used, the user may choose from a series of preprogrammed messages. Once specified, the message can then be delivered to the displays (front, rear, or side) in normal or mirror imaged formats. The display system can also monitor ambient light conditions to make appropriate brightness and contrast adjustments to maximize message readability.

22 Claims, 3 Drawing Sheets

VOICE OPERATED INTERACTIVE MESSAGE DISPLAY SYSTEM FOR VEHICLES

FIELD OF THE INVENTION

The present invention relates to vehicle display systems. More particularly, the present invention relates to an interactive way to communicate messages outside a vehicle.

BACKGROUND OF THE INVENTION

Over the years, many technologies have been developed to help occupants of motor vehicles communicate with one another. Simple signs and hand signals were used early on. Later, signal lights and displays were developed. An example of one such device is shown in U.S. Pat. No. 5,132,666 (the "'666 Patent"). The display device shown in the '666 Patent includes a lighted sign section similar to signs seen on city taxis and buses which, in general, acts like a small billboard. The device also includes a programmable electronic display that may display one of several pre-programmed messages. Although this device and ones like it are functional and relatively inexpensive, they are designed more for advertising than other types of communication. Thus, these types of devices can generally display only those messages that are fixed in hard-copy form or available in pre-programmed memory. They are not useful for situations where an individual in the vehicle must relay some non-programmed information, such as a call for help or a report on the present status of the vehicle or its occupants.

Of course, there are other technologies for accomplishing inter-vehicle communication. They include citizens band (CB) radio and mobile telephone. However, both of these technologies have limitations as well. First, they require both the sender and receiver of information to have compatible sender-receiver systems. Second, both sender and receiver must coordinate the transmission conduit of the information, through either transmission channel or phone number. Accordingly, these systems are viable only when both the sender and receiver have compatible equipment and have access to the same or a compatible communications infrastructure. Even today, many vehicles are not equipped with such devices, in part because obtaining such equipment and access can be expensive.

Thus, it would be desirable to have an inter-vehicle communication system that was relatively inexpensive, non-dependent on compatible sender-receiver systems and complex communications infrastructures, and able to communicate real-time information from the occupants in the vehicle to people outside the vehicle. It would also be beneficial if the system was designed for hands-free operation so that a driver of a motor vehicle could operate it without removing his or her hands from steering and other controls of the vehicle.

OBJECTS AND SUMMARY OF THE INVENTION

Therefore, it is an object of the present invention to provide an improved inter-vehicle communication system.

It is another object of the present invention to provide an improved inter-vehicle system that does not require the receiver to have compatible receiving equipment or rely on a predetermined transmission channel.

It is another object of the present invention to provide a hands-free, vehicle-based communication system in the form of a voice-based interactive message display system that allows a sender to conveniently send messages to other nearby vehicles or pedestrians.

These and other objects are achieved in a voice-operated message display system that includes coordinated forward and rear facing light-emitting displays combined with a versatile programming mechanism which, used in combination, make it possible for one-way communication that only requires the sender to have appropriate equipment. In one embodiment of the invention, the system includes message display screens adapted to be mounted to the front and rear of a vehicle. The display screens include a matrix of light-emitting elements for the display of selected patterns of light in response to the stimulus from a controller under the direction of voice commands from a user. Following manual activation, a sequence of synthesized vocal prompts are used to determine the desired message, on which displays to display that message, and in what forms it should be displayed. The user's desires are determined by means of a voice recognition unit with a vocabulary contained in a replaceable memory module. In addition, the display system uses ambient light sensors to automatically adjust the brightness and contrast settings to improve the visibility of the displayed message.

These are just some of the features and advantages of the present invention. Many others will become apparent by reference to the detailed description of the invention taken in combination with the accompanying drawings.

DETAILED DESCRIPTION

Figure 1:
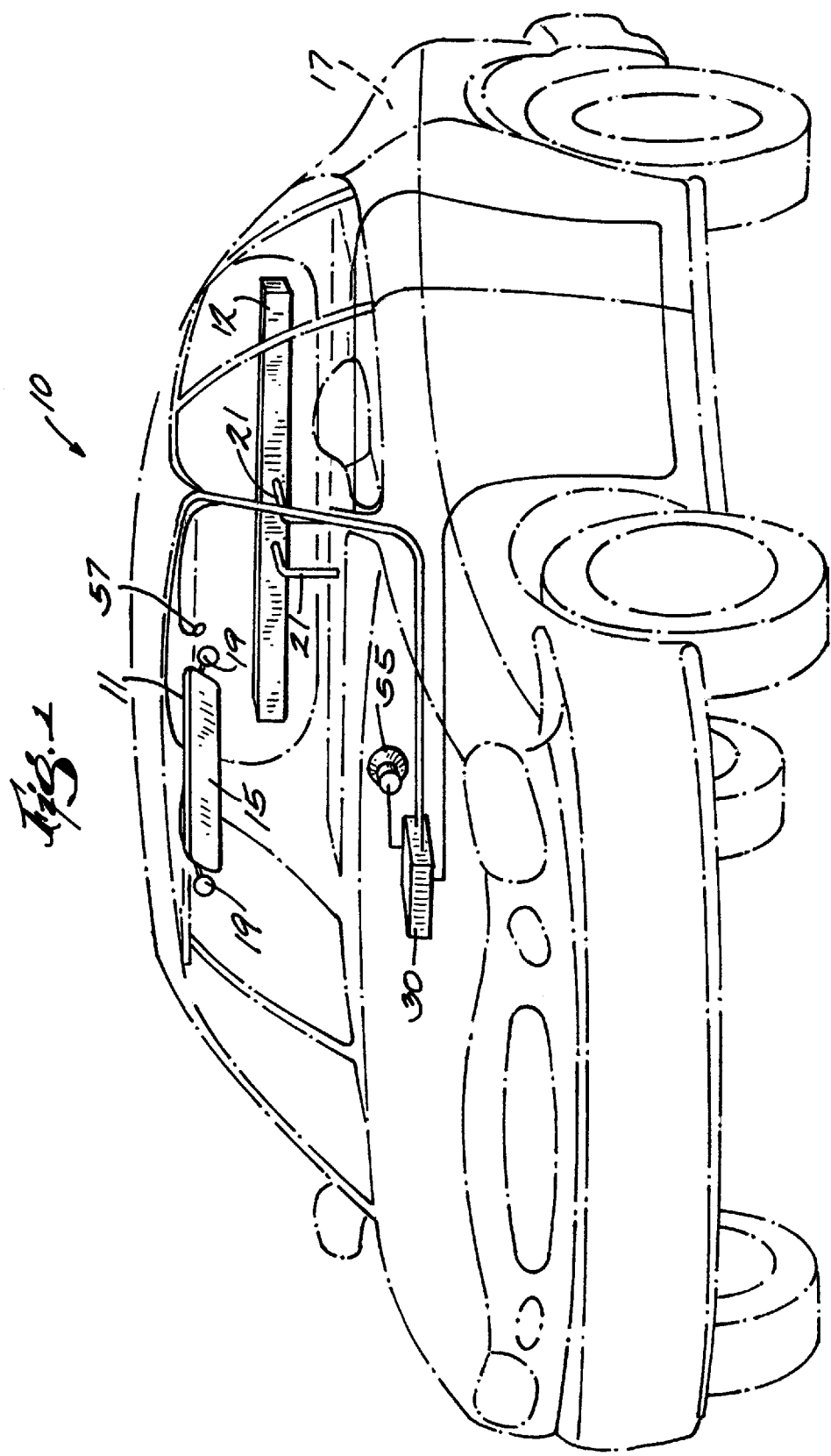
FIG. 1 is a perspective view of a vehicle having a display system mounted in it that embodies the principles of the current invention.

A display system 10 constructed in accordance with the principles of the present invention is shown in FIG. 1. The display system 10 includes two display units 11 and 12. Each display unit 11 and 12 includes a narrow, elongated display panel 15 and is detachably mounted by suitable mounting mechanisms to a vehicle 17. As shown, the display unit 11 is mounted to the front windshield of the vehicle 17 by suction cups 19 and the display unit 12 is mounted to the interior rear deck 20 of the vehicle 17 near the rear windshield by brackets 21. It will be readily understood, of course, that the illustrated mounting mechanisms are merely exemplary of many different types of mountings that may be used with this invention. Screws, bolts, or other devices that detachably secure the display units l1 and 12 in a desired position may be used. It is also readily understood that the exact size, shape, and location of the display units at the front and rear of the vehicle as shown in FIG. 1 are exemplary and that their size, shape, and location will vary from vehicle to vehicle (which may include, for example, boats, trucks, cars, motorcycles, etc.) and application to application, so long as they are positioned to allow proper viewing without unduly obstructing the view of the driver out of the vehicle. For example, mounting more or less than two displays on the vehicle or displays on or near a side window is possible.

An exemplary display panel may have a width of about forty inches, a height of two inches, and a thickness of one inch and have the ability to visibly display a text message of at least one line in height, but potentially more lines with displays of greater height. Suitable displays include LED panels, panels embedded in or applied directly to windows or windshields, and other displays having a matrix of light-emitting elements organized as dots or segments which are capable of displaying most Western European text as specified, for example, by ISO-8859. However, displays capable of displaying logographic language text might also be employed.

Figure 3:
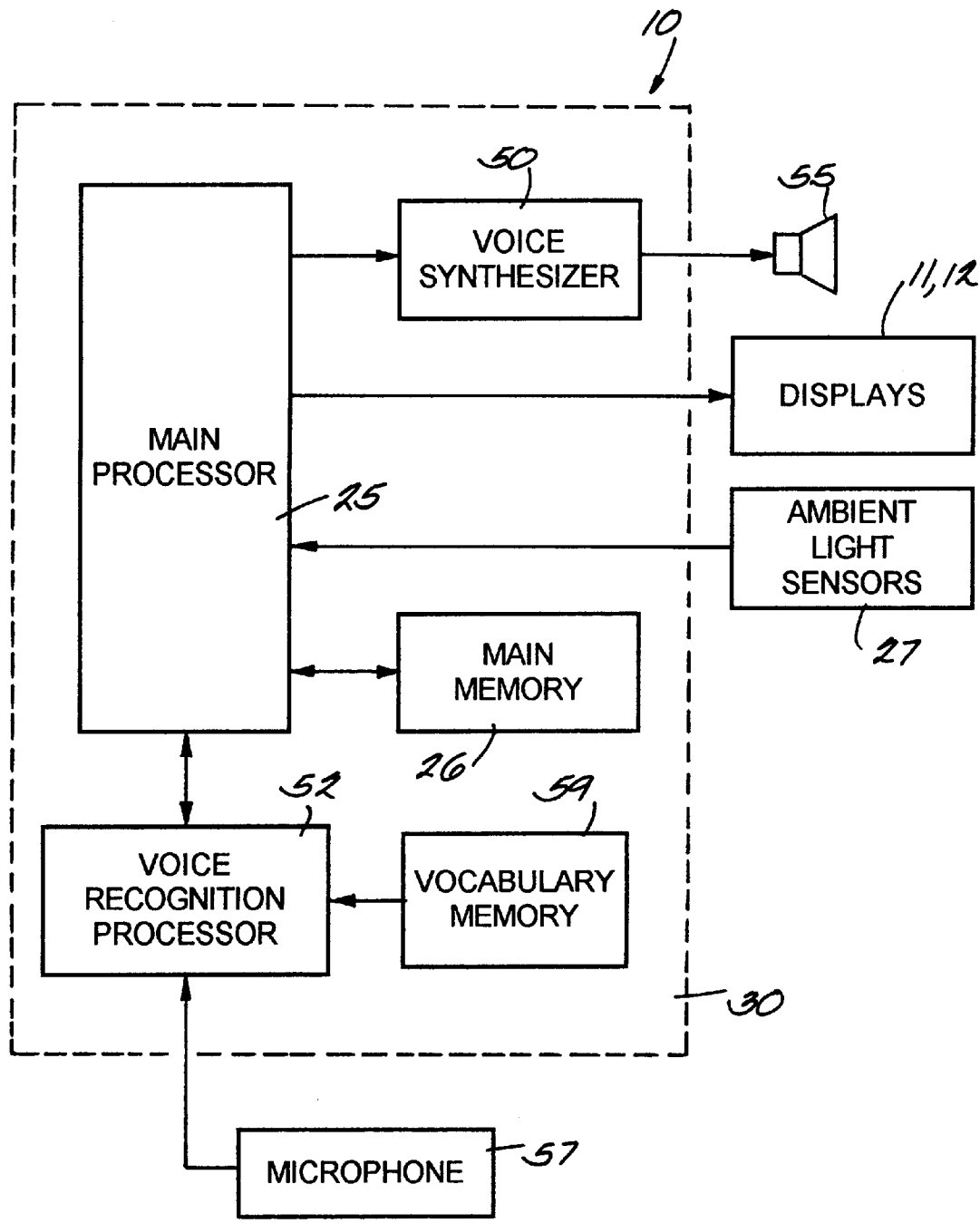
FIG. 3 is a simplified block diagram of the display system of the present invention and its major control elements.

As can be seen by reference to FIG. 3, each display unit 11, 12 is controlled by a main processor 25 located in a central control unit 30. More specifically, the main processor 25 generates message signals (as more fully described below) which are delivered to the display units 11 and 12. Processors suitable for use in the present invention include those in the Motorola HC11 or HC12 families, PIC family, Intel MCS-51 family, or similar devices.

The main processor 25 is coupled to a storage device or memory 26 which can be used to store the current message being displayed. As should be understood, the memory 26 while shown as external memory could be incorporated, in whole or part, in the main processor 25. The main processor 25 is arranged to energize selected patterns among the light-emitting elements of the display panels 15 so as to display text information or other desired indicia. Through the use of ambient light sensors 27, the main processor 25 also monitors the ambient light conditions of the display units 11 and 12 to appropriately adjust the brightness and contrast of the light-emitting elements in each display panel 15, maximizing visibility under a broad range of light conditions, from the dark of night and tunnels to very bright sunny conditions.

The central control unit 30 is responsible for the specification of the messages to display and the rules under which longer messages are divided into smaller segments before being communicated to the individual display units 11, 12. The central control unit 30 also manages the voice synthesis and voice recognition system (to be described) so that the messaging requirements of the user can be determined and then implemented.

The control unit 30 may be positioned in any convenient place in the vehicle 17 such as the trunk or, as shown in FIG. 1, the dash. The control unit 30 includes the main processor 25 and the storage device or memory 26, which has sufficient quantity and type of memory and input/output connections to meet the needs of the system (as described further below). The entire system 10 is powered by a suitable electrical source, such as the vehicle battery (not shown) and is activated by a manual on/off switch (also not shown) which may be positioned in a location in the vehicle 17 accessible to the user. To meet the requirements of system 10, the storage device or memory 26 includes three types of memory: sufficient read-only memory (ROM) to support the software and firmware necessary to program all of the message system display features (for example, internal ROM or 27xx chip family memory); read-write random-access memory (RAM) to store values during normal operation (for example, internal RAM or 61xx or 21xx chip family memory); and non-volatile read-write memory (e.g. EEPROM including 28xx chip family memory) to store preset messages (described in the example below). Preset messages are programmed orally by the user in a specific operating mode.

The main processor 25 coordinates the interaction of a voice synthesizer 50, a voice recognition processor 52, and the displays 11 and 12. The voice synthesizer 50 may be one of many commercially available synthesizers (such as the one included in the OKI Semiconductor MSM 6679A chip) that under the direction of a processor can generate human speech to be broadcast over a conventional speaker 55. Although shown as a separate component of the present invention, the speaker 55 as specifically shown may not be necessary in many instances. The system 10 may be designed to connect directly to the vehicle's audio system and utilize its speakers. In such an embodiment, the system would by-pass or mute whatever audio program (e.g., radio, CD, etc.) is being played by the vehicle's audio system when the system 10 is activated.

Like the voice synthesizer, the voice recognition processor 52 may be one of many commercially available voice processors (including Sensory RSC-164 or RSC-164I or OKI Semiconductor MSM 6679A) which monitor the electrical signal from a conventional microphone and determine the words being spoken. The present invention utilizes such a standard voice recognition processor and a microphone 57 mounted in the interior of the vehicle 17. As shown in FIG. 1, one suitable location for the microphone 57 is on, in, or near the driver's seat of the vehicle 17.

The voice recognition processor 52 utilizes a separate vocabulary memory 59 to recognize certain words. The vocabulary memory may be one of many commercially available vocabulary memories. Virtually all such memories are designed to hold preprogrammed messages. Using methods and devices known in the art, the vocabulary memory 59 may be removed from the control unit 30 and reprogrammed via a separate unit or through a programming mode so that programmed messages may be stored. Other vocabulary memories are capable of storing words or phonemes as well as pre-programmed messages. Such enhanced units, while expensive, permit run-time programming of the message to be displayed, i.e., they can recognize the spoken message of the user and translate that message to a signal that causes the display unit 11, 12 to display the spoken message verbatim. If vocabularies based on phoneme recognition are implemented, the vocabulary memory 59 may have a very large and, perhaps, unlimited vocabulary.

Figure 2:
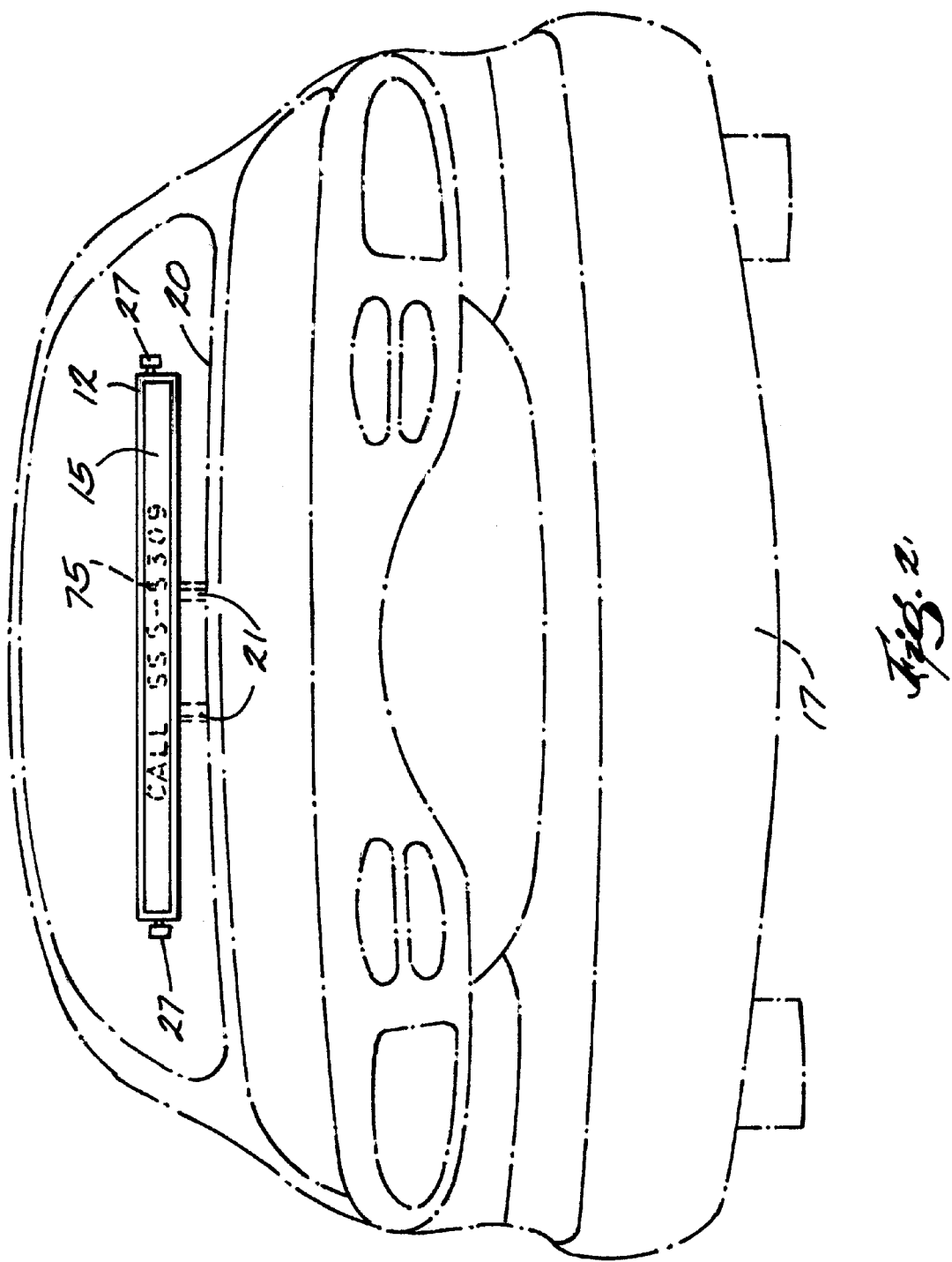
FIG. 2 is a rear elevational view of the vehicle of FIG. 1 showing a message displayed on the rear display of the system.

A significant feature of the present invention is the combination of the described displays 11 and 12 with an interactive, hands-free, voice-based operating system. The message being displayed (e.g., the message 75 in FIG. 2) on the display panels is communicated vocally by the user through the use of the reprogrammable voice recognition processor 52 and in response to a series of vocal prompts from the voice synthesizer 50. What follows is a representative but not exclusive example of the message display system's operation. Following manual activation of the message display system via the on/off switch, the display system 10 generates a vocal welcome message and vocally queries the user how and where a message is to be displayed (e.g. front display normal, front display mirrored, rear display, or combinations thereof). Following the user's verbal response, the message display system 10 vocally queries the user if a custom message or a pre-stored message is to be displayed. If a custom message is to be displayed, the user provides that message vocally and it is then recorded by the message display system 10. If a preset message is selected, it is loaded from the memory 26 and then parsed by the main processor 25 subject to the size restrictions of the particular display units 11, 12 mounted in the vehicle 17. Then the message (whether preprogrammed or not) is communicated to the appropriate display unit(s) to be displayed at a rate that is neither too fast nor too slow for most readers (e.g., 5 seconds per line). The message display system 10 then continues to display the message until vocally directed to do otherwise by the user.

Accordingly, the present invention provides a communication system that does not require compatible sender/receiver systems or coordination of the communication channel between the sender and receiver. It permits efficient inter-vehicle and extra-vehicle communication of real-time information. Further, while it has been described in what are believed to be the most preferred forms, it is to be understood that the invention is not confined to the particular construction and arrangement of the components herein illustrated and described, but embraces such modified forms thereof as come within the scope of the appended claims.

What is claimed is:

1. A voice-activated message display system for a vehicle, the system comprising:
    at least one display unit mounted on the vehicle and being operable to display a message to permit communication with individuals outside of the vehicle;
    a central control unit coupled in data communication with said at least one display unit, said central control unit being operable to provide said message to said at least one display unit in response to receiving a voice command, said control unit including
        a main processor, and
        a voice recognition processor coupled in data communication with said main processor; and
    a microphone coupled in data communication with said voice recognition processor, said microphone being operable to receive said voice command and to provide said voice command to said central control unit.

2. A voice-activated message display system as in claim 1, wherein said vocabulary memory stores a plurality of pre-programmed messages.

3. A voice-activated message display system as in claim 1, further comprising a voice synthesizer coupled in data communication with said main processor and a speaker coupled in data communication with said voice synthesizer.

4. A voice-activated message display system as in claim 1, wherein the vehicle includes a rear window and a second window, wherein the system comprises a first display unit and a second display unit, each of said first and second display units coupled in data communication to said central control unit, and wherein said first display unit is positioned near said rear window and said second display unit is positioned near said second window.

5. A voice-activated message display system as in claim 4, wherein said first and second display units each have a matrix of light-emitting elements.

6. A voice-activated message display system as in claim 5, further comprising at least one ambient light sensor coupled to said main processor.

7. A voice-activated message display system as in claim 1, further comprising at least one ambient light sensor coupled to said main processor.

8. A voice-activated message display system as in claim 7, wherein said at least one display unit has a light output intensity, wherein said at least one ambient light sensor has an ambient light sensor signal, and wherein said main processor is operable to adjust said light output intensity in response to said at least one ambient light sensor signal.

9. A voice-activated message display system as in claim 1, wherein said second window is a front windshield.

10. A voice-activated message display system as in claim 1, wherein said microphone is further operable to receive an audible signal having information, and wherein said at least one display unit displays said information in a substantially real-time response to said microphone receiving said audible signal.

11. A voice-activated messaged display system for an overland vehicle having a front windshield and a rear window, the system comprising:
    a first display unit mounted on the vehicle in a position viewable outside the vehicle, said first display unit including at least one ambient light sensor;
    a second display unit mounted on the vehicle in a position viewable outside the vehicle, said second display unit including at least one second ambient light sensor;
    a central control unit coupled in data communication with said first and second display units, said central control unit including
        a main processor,
        a voice recognition processor coupled in data communication with said main processor,
        a vocabulary memory coupled in data communication with said voice recognition processor, and
        a voice synthesizer coupled in data communication with said main processor,
        a microphone coupled in data communication with said voice recognition processor; and
        a speaker coupled in data communication with said voice synthesizer.

12. A voice-activated message display system as in claim 11, wherein said vocabulary memory stores a plurality of pre-programmed messages.

13. A vehicle, comprising:
    a first display unit mounted on the vehicle in a position viewable outside the vehicle;
    a central control unit coupled in data communication with said first display unit, said central control unit including
        a main processor,
        a voice recognition processor coupled in data communication with said main processor,
        a vocabulary memory coupled in data communication with said voice recognition processor,
        a voice synthesizer coupled in data communication with said main processor; and
        a microphone coupled in data communication with said voice recognition processor, and a speaker coupled in data communication with said voice synthesizer.

14. A vehicle as in claim 13, wherein said vocabulary memory stores a plurality of pre-programmed messages.

15. A vehicle as in claim 13, further comprising at least one ambient light sensor coupled to said main processor.

16. A vehicle as in claim 13, wherein said first unit has a matrix of light-emitting elements.

17. A vehicle as in claim 13, further comprising a second display unit mounted on the vehicle in a position viewable outside the vehicle, coupled in data communication with said voice-controlled central control unit, and positioned opposite said first display unit.

18. A vehicle as set forth in claim 13, further comprising a microphone in data communication with the microprocessor and being operable to receive an audible signal having information, and wherein said at least one display unit displays said information in a substantially real-time response to said microphone receiving said audible signal.

19. A method of extra-vehicle communication from a vehicle to a person exterior to the vehicle, comprising:
    mounting a display unit on the vehicle so that said display is viewable to individuals outside the vehicle;
    establishing a format of a textual message using voice commands;
    generating a voice signal having information;

processing said voice signal in a voice recognition processor in response to generating said voice signal, said processing including converting said information into said textual message;

providing said textual message to said display unit; and displaying said textual message on said display unit in response to receiving said voice signal, said response being a substantial real-time response.

20. A method as set forth in claim 19, further comprising:

mounting a second display on said vehicle;

controlling display of said textual message on the display and second display using voice commands.

21. A method as set forth in claim 19, wherein said display unit has a light output intensity, and wherein the method further comprises:

generating an ambient light sensor signal from an ambient light sensor;

varying the light output intensity of said display unit in response to said ambient light sensor signal.

22. A method as set forth in claim 19, wherein the vehicle has a rear window and a second window, wherein said display unit is mounted near said rear window, and wherein the method further comprises:

mounting a second display unit on the vehicle near the second window;

providing said textual message to said second display unit; and displaying said textual message on said display unit and said second display unit in response to receiving said audio signal, said response being a substantial real-time response.

* * * * *